(12) United States Patent
Lu et al.

(10) Patent No.: US 9,949,312 B2
(45) Date of Patent: Apr. 17, 2018

(54) METHOD AND APPARATUS FOR UPDATING MEASUREMENT IDENTITY AND SYSTEM

(71) Applicant: FUJITSU LIMITED, Kawasaki-shi, Kanagawa (JP)

(72) Inventors: Yanling Lu, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 91 days.

(21) Appl. No.: 15/235,943

(22) Filed: Aug. 12, 2016

(65) Prior Publication Data

US 2016/0353512 A1    Dec. 1, 2016

Related U.S. Application Data

(63) Continuation of application No. PCT/CN2014/072313, filed on Feb. 20, 2014.

(51) Int. Cl.
  *H04W 76/02*    (2009.01)
  *H04W 24/10*    (2009.01)
  (Continued)

(52) U.S. Cl.
  CPC ......... *H04W 76/028* (2013.01); *H04J 11/005* (2013.01); *H04L 47/29* (2013.01);
  (Continued)

(58) Field of Classification Search
  CPC ...... H04W 24/10; H04W 76/02; H04W 52/02
  See application file for complete search history.

(56) References Cited

U.S. PATENT DOCUMENTS

| 2012/0003943 A1* | 1/2012 | Marinier ........... H04W 36/0083 455/73 |
| 2012/0252432 A1 | 10/2012 | Henttonen |

(Continued)

FOREIGN PATENT DOCUMENTS

| CN | 101959171 A | 1/2011 |
| CN | 102098682 A | 6/2011 |
| CN | 102291787 A | 12/2011 |

OTHER PUBLICATIONS

3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.*

(Continued)

*Primary Examiner* — Kamran Afshar
*Assistant Examiner* — Farideh Madani
(74) *Attorney, Agent, or Firm* — Myers Wolin, LLC (57) ABSTRACT

A method and apparatus for updating a measurement identity and a system. The method includes: checking each measurement identity in a measurement identity list included in a pre-stored measurement configuration variable by terminal equipment after performing connection reconfiguration or connection re-establishment; and removing the measurement identity from the measurement configuration variable by the terminal equipment, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists. With the method of the embodiments of the present disclosure, meaningless measurement (Continued)

by the terminal equipment is reduced, power consumption is lowered, and interference on normal communications is reduced.

20 Claims, 4 Drawing Sheets (51) Int. Cl.
    *H04J 11/00*     (2006.01)
    *H04L 12/801*     (2013.01)
    *H04L 29/06*     (2006.01)
    *H04W 52/02*     (2009.01)
    *H04W 36/00*     (2009.01)

(52) U.S. Cl.
    CPC .............. *H04L 69/28* (2013.01); *H04W 24/10* (2013.01); *H04W 52/0209* (2013.01); *H04W 36/0083* (2013.01); *Y02B 60/50* (2013.01)

(56) References Cited

U.S. PATENT DOCUMENTS

2013/0258862 A1    10/2013  Dinan
2013/0344868 A1    12/2013  Yamada

OTHER PUBLICATIONS

Extended European Search Report issued for corresponding European Patent Application No. 14883187.8 dated Jun. 26, 2017.
Nsn et al: "RRM measurements for Dual Connectivity", Agenda Item: 7.2.2, 3GPP TSG-RAN WG2 Meeting #85, R2-140374, Prague, Czech Republic, Feb. 10-14, 2014.
Huawei: "[70#12]LTE CA: Measurement Object Swapping", Agenda Item: 7.1.1.5, 3GPP TSG-RAN WG2 Meeting #70bis, R2-103942, Stockholm, Sweden, Jun. 28-Jul. 2, 2010.
Fujitsu: "Handling of measld when PSCell frequency is changed", Agenda Item: 7.1.2.1, 3GPP TSG-RAN WG2 Meeting #87bis, R2-144290, Shanghai, China, Oct. 6-10, 2014.
Notification of Reasons for Refusal issued by the Japan Patent Office for corresponding Japanese Patent Application No. 2016-553008, dated Aug. 22, 2017, with an English translation.
Written Opinion of the International Searching Authority issued for corresponding International Patent Application No. PCT/CN2014/072313 dated Nov. 26, 2014, with English translation.
International Search Report issued for corresponding International Patent Application No. PCT/CN2014/072313 dated Nov. 26, 2014, with English translation.

* cited by examiner

101 terminal equipment checks each measurement identity in a measurement identity list included in a pre-stored measurement configuration variable after performing connection reconfiguration or connection re-establishment

102 if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists, the terminal equipment removes the measurement identity from the measurement configuration variable

METHOD AND APPARATUS FOR UPDATING MEASUREMENT IDENTITY AND SYSTEM

CROSS REFERENCE TO RELATED APPLICATIONS

This application is a continuation application of International Application PCT/CN2014/072313 filed on Feb. 20, 2014, the entire contents of which are incorporated herein by reference.

FIELD

The present disclosure relates to the field of communications, and in particular to a method and apparatus for updating a measurement identity and a system.

BACKGROUND

In an LTE-A (long-term evolution-advanced) CA (carrier aggregation) system, multiple carriers are aggregated, and may communicate with a single terminal (UE, user equipment, also referred to as terminal equipment, and a terminal in brief) at the same time, that is, one terminal has multiple serving cells. In the multiple serving cells, one is a PCell (primary cell), and others are SCells (secondary cells). In an existing CA system, aggregated cells are all under coverage of the same base station (eNB), and belong to a CA system of the same eNB.

In the existing CA system, the eNB needs to configure terminal with measurement configuration, including:

measurement objects: the object on which the terminal shall perform measurements; for intra-frequency or inter-channel measurements of an E-UTRA (evolved universal terrestrial radio access) system, a measurement object is a single E-UTRA carrier frequency, and an E-UTRAN (evolved universal terrestrial radio access network) is able to configure a list of cell specific offsets and a list of "blacklist" cells associated with the carrier frequency, blacklisted cells being not considered in event evaluation or measurement reporting; for inter-RAT (radio access technology) UTRA (universal terrestrial radio access) measurement, a measurement object is a set of cells on a single UTRA carrier frequency; for inter-RAT GERAN (GSM (global system for mobile communication) EDGE (enhanced data rate for GSM evolution) radio access network) measurement, a measurement object is a set of GERAN carrier frequencies; and for inter-RAT CDMA2000 (code division multiple access) measurement of inter-RAT, a measurement object is a set of cells on a single HRPD (CDMA2000 high rate packet data) or 1×RTT (CDMA2000 1× radio transmission technology) carrier frequency;

reporting configurations: a list of reporting configurations where each reporting configuration consists of a reporting criterion and a reporting format, the reporting criterion being a criterion that triggers the terminal to send a measurement report, and may be periodical or a single event description, and the reporting format referring to the quantities that the terminal includes in the measurement report and associated information, such as the number of cells to report, etc.;

measurement identities: a list of measurement identities where each measurement identity links one measurement object with one reporting configuration; by configuring multiple measurement identities, it is possible to link more than one measurement object to the same reporting configuration, as well as to link more than one reporting configuration to the same measurement object; and the measurement identity is used as a reference number in the measurement report;

quantity configurations: one quantity configuration is configured per RAT type, the quantity configuration defining the measurement quantities and associated filtering used for all event evaluation and related reporting of that measurement type, one filter can be configured per measurement quantity; and measurement gaps: periods that the terminal may use to perform measurements, that is, no uplink (UL) and downlink (DL) transmissions are scheduled.

An E-UTRAN configures only one measurement object for a given frequency, that is, it is impossible to configure two or more measurement objects for the same frequency with different associated parameters, such as different offsets and/or blacklists. The E-UTRAN may configure multiple instances of the same event, such as configuring two reporting configurations with different thresholds.

Furthermore, a measurement event in the reporting criterion related only to the current system and used for triggering a measurement report further includes following six events:

event A1: a serving cell becomes better than a threshold;

event A2: a serving cell becomes worse than a threshold;

event A3: a neighboring cell becomes offset better than a PCell; wherein, a frequency used by the neighboring cell may be different from a frequency used by the PCell, and the neighboring cell may be a serving cell;

event A4: the neighboring cell becomes better than a threshold;

event A5: the PCell becomes worse than a threshold and the neighboring cell becomes better than another threshold; wherein, a frequency used by the neighboring cell may be different from a frequency used by the PCell, and the neighboring cell may be a serving cell; and event A6: the neighboring cell becomes offset better than an SCell; wherein, the neighboring cell is at the same frequency as the SCell.

At a terminal side, in order to record the configuration and the procedure related to the measurements, two variables related to the measurement are stored, that is, a measurement configuration variable and a measurement report list variable.

Measurement configuration variable: the terminal stores in it accumulative configuration of measurement needing to be performed, the measurement including intra-frequency, inter-frequency and inter-RAT mobility related measurement. In this way, in each time of performing measurement configuration by an eNB on the terminal via air interface or executing a measurement-related procedure by the terminal, it is possible that the terminal may modify the measurement configuration variable stored by it. Particular contents of the measurement configuration variable include a measurement identity list, a measurement object list, a reporting configuration list, quantity configuration, an s-measure and a speed status parameter.

The measurement report list variable: the terminal stores in it related information on measurement satisfying a triggering condition, including a list of measurement having triggered report. Each measurement in the list triggering the report further includes a corresponding measurement identity, a list of cells in which report has been triggered, and the number of reports that have been transmitted.

In receiving the measurement configuration from the eNB, performing the measurement, reporting a measurement result and executing a measurement-related procedure, the terminal is possible to modify the measurement configuration variable and the measurement report list variable, such as a removal operation on a measurement identity performed by the terminal side. In the existing CA system, automatic removal of the measurement identity at the terminal side is only applicable to A1, A2 and A6 of the existing measurement events.

And on the other hand, in the existing LTE-A system, a macro cell is mainly deployed. As increase of an amount of traffics in the future, it is possible that small cells are further deployed. Coverage of a small cell is relatively small, but the number of the small cells is relatively large. Hence, if small cells are simply deployed only, and no control and structure optimization are performed, many problems, such as degradation of robustness of mobility, and increase of burden of control signaling, etc., will be resulted in. In order to solve these problems, and at the same time, in order to increase flows of single user, a new-type network protocol architecture, dual connectivity, is proposed in the industry. In the dual connectivity architecture, the terminal may communicate with multiple eNBs at the same time. For example, the terminal may communicate with a macro eNB and a small cell eNB at the same time, or may communicate with two small cell eNBs at the same time. In the eNBs communicating with the terminal at the same time, one eNB always provides the terminal with a control interface between the terminal and a core network, and this eNB is referred to as a primary eNB. Other eNBs than the primary eNB communicating with the terminal at the same time are referred to as secondary eNBs. And at the same time, in serving cells of the terminal, a cell group associated with the primary eNB is referred to as a primary cell group, and a cell group associated with the secondary eNBs is referred to as a secondary cell group.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In a dual connectivity architecture, serving cells of terminal are distributed in two cell groups, in a primary cell group, there exist a primary cell, and there may also exist a secondary cell; and in a secondary cell group, there exist at least one secondary cell, and at least one secondary cell in the secondary cell group carries a PUCCH (physical uplink control channel) of the terminal. For the convenience of explanation, a secondary cell in the secondary cell group carrying a PUCCH is referred to as "a primary secondary cell" of the terminal.

In a dual connectivity architecture, the system will define some new measurement events. In the new measurement events, it is possible that there are requirements on an associated measurement object, such as requiring that the measurement object is a frequency at which a cell belonging to a secondary cell group is operating. Or, in the new measurement events, it is required that a measurement result of the measurement object is compared with a measurement result of a specific cell, such as a primary secondary cell. If a connection reconfiguration or connection re-establishment procedure occurs in the terminal, a measurement object associated with the measurement events possibly no longer satisfies the requirements of the measurement events, or a cell of which a measurement result is compared with that of the measurement object (briefly referred to as a comparing cell, for the convenience of explanation) exists no longer. At this moment, if the existing protocols are followed, the terminal can only remove measurement identities associated with events A1, A2 and A6, cannot remove measurement identities associated with the new measurement events, and the terminal will proceed with performing meaningless measurement, which consumes energies of the terminal, and affects normal communications.

Embodiments of the present disclosure provide a method and apparatus for updating a measurement identity and a system, so as to solve a problem of meaningless measurement due to that terminal cannot remove a measurement identity associated with new measurement events in a dual connectivity architecture.

According to a first aspect of the embodiments of the present disclosure, there is provided a method for updating a measurement identity, including:

checking each measurement identity in a measurement identity list included in a pre-stored measurement configuration variable by terminal equipment after performing connection reconfiguration or connection re-establishment; and removing the measurement identity from the measurement configuration variable by the terminal equipment, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

According to a second aspect of the embodiments of the present disclosure, there is provided an apparatus for updating a measurement identity, applicable to terminal equipment, wherein the apparatus includes:

a checking unit configured to check each measurement identity in a measurement identity list included in a pre-stored measurement configuration variable after the terminal equipment performs connection reconfiguration or connection re-establishment; and a processing unit configured to remove the measurement identity from the measurement configuration variable, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

According to a third aspect of the embodiments of the present disclosure, there is provided terminal equipment, including the apparatus for updating a measurement identity as described in the second aspect.

According to a fourth aspect of the embodiments of the present disclosure, there is provided a communication system, including an eNB and terminal equipment; wherein the terminal equipment is configured to check each measurement identity in a measurement identity list included in a pre-stored measurement configuration variable after performing connection reconfiguration or connection re-establishment, and remove the measurement identity from the measurement configuration variable, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

According to another aspect of the embodiments of the present disclosure, there is provided a computer-readable program, wherein when the program is executed in terminal equipment, the program enables the terminal equipment to carry out the method for updating a measurement identity as described in the first aspect.

According to a further aspect of the embodiments of the present disclosure, there is provided a storage medium in which a computer-readable program is stored, wherein the computer-readable program enables terminal equipment to carry out the method for updating a measurement identity as described in the first aspect.

An advantage of the embodiments of the present disclosure exists in that with the method, apparatus and system of the embodiments of the present disclosure, meaningless measurement by the terminal is reduced, power consumption is lowered, and interference on normal communications is reduced.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings. These embodiments are illustrative only, and are not intended to limit the present disclosure.

Embodiment 1

Figure 1:
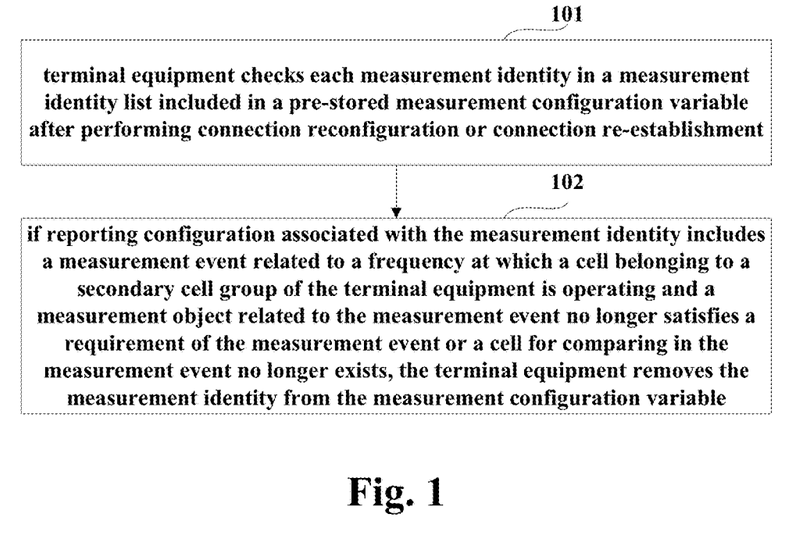
FIG. 1 is a flowchart of an implementation of the method for updating a measurement identity of an embodiment of the present disclosure.

An embodiment of the present disclosure provides a method for updating a measurement identity, which is applicable to terminal equipment in a dual connectivity architecture; however, this embodiment is not limited thereto. For the convenience of explanation, the method shall be described below taking that it is applied to terminal equipment in a dual connectivity architecture as an example. FIG. 1 is a flowchart of the method. Referring to FIG. 1, the method includes:

step 101: terminal equipment checks each measurement identity in a measurement identity list included in a pre-stored measurement configuration variable after performing connection reconfiguration or connection re-establishment;

in this embodiment, as described above, each terminal stores a measurement configuration variable and a measurement report list variable; the measurement configuration variable contains a measurement identity list, the measurement identity list indicating each measurement identity that is needed to be measured; and as described above, each measurement identity is associated with a measurement object and a reporting configuration;

step 102: if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists, the terminal equipment removes the measurement identity from the measurement configuration variable.

In this embodiment, an eNB is possible to configure the terminal with a new measurement event, and the new measurement event is related to a frequency at which a cell in a secondary cell group of the terminal is, then, if the reporting configuration associated with the measurement identity in the measurement identity list of the measurement configuration variable of the terminal includes the new measurement event, and the measurement object related to the new measurement event no longer satisfies the requirement of the measurement event or the cell for comparing in the measurement event no longer exists after connection reconfiguration or connection re-establishment by the terminal, the terminal may remove the measurement identity from the measurement configuration variable, so as to avoid that the terminal proceeds with measurement to which the measurement identity corresponds, thereby reducing unnecessary power consumption and influence on normal communications.

In an implementation of this embodiment, if the measurement report list variable of the terminal includes a measurement report record to which the measurement identity corresponds, that is, the terminal has performed measurement and report on the measurement identity, the terminal may further remove the measurement report record to which the measurement identity corresponds from the measurement report list variable.

In an implementation of this embodiment, if a timer corresponding to the measurement identity is running, the terminal may further stop the timer which is running and corresponds to the measurement identity, and reset information related to the measurement identity. The timer here may be a periodic reporting timer, and this embodiment is not limited thereto. The information related to the measurement identity here may be a time to trigger (TTT); however, this embodiment is not limited thereto.

In this embodiment, the new measurement event may be a measurement result of a neighboring cell is better than a sum of a measurement result of a primary secondary cell and a predefined offset value, or a measurement result of a neighboring cell is better than a first threshold, and at the same time, a measurement result of a primary secondary cell is worse than a second threshold, or a measurement result of the cell is better than a third threshold, or a measurement result of the cell is worse than a fourth threshold; however, this embodiment is not limited thereto, and another measurement event associated with the frequency at which the cell in the secondary cell group of the terminal in a dual connectivity architecture is may also be taken as the new measurement event of this embodiment.

In this embodiment, a cell triggering the new measurement event is at a frequency indicated by the measurement object associated with the measurement identity, wherein, the frequency indicated by the measurement object may be a frequency at which a cell belonging to a secondary cell group or belonging to a secondary eNB of the terminal is operating other than a frequency at which the primary secondary cell is operating, may be a frequency at which a cell belonging to a secondary cell group or belonging to a secondary eNB of the terminal is operating, may be a frequency at which a cell belonging to a primary cell group or belonging to a primary eNB of the terminal is operating, may be a frequency at which the terminal is operating other than a frequency at which a primary cell is operating, may be a frequency at which the terminal is operating other than a frequency at which a primary secondary cell is operating, may be a frequency at which the terminal is operating other than a frequency at which a primary cell and a primary secondary cell are operating, and so on, and this embodiment is not limited thereto.

In this embodiment, operations capable of triggering the terminal to automatically remove the measurement identity include connection reconfiguration and connection re-establishment, the connection reconfiguration including switch and non-switch. For the terminal in the dual connectivity architecture, it may automatically perform the operations of automatically removing the measurement identity proposed in this embodiment after performing the connection reconfiguration or the connection re-establishment. In this embodiment, after the connection reconfiguration is performed, the primary cell of the terminal does not change, but the secondary eNB changes, or the primary cell of the terminal does not change, the secondary eNB does not change, but the primary secondary cell changes, or the primary cell and the primary secondary cell of the terminal do not change, but a normal secondary cell changes, that is, the secondary cell in the primary cell group and/or a secondary cell other than the primary secondary cell in the secondary cell group change(s), or, the primary cell of the terminal does not change, but the dual-connectivity architecture does not exist any longer, that is, the terminal communicates with only one eNB, or, the primary cell of the terminal changes, that is, the terminal performs switch, in which case a cell in the secondary cell group may be possible to change, and may be possible not to change, and it is possible that the dual-connectivity architecture does not exist any longer. In this embodiment, after the connection reconfiguration is performed, the terminal has only one serving cell, that is, the primary cell.

The method of this embodiment shall be described below by way of examples.

Figure 2:
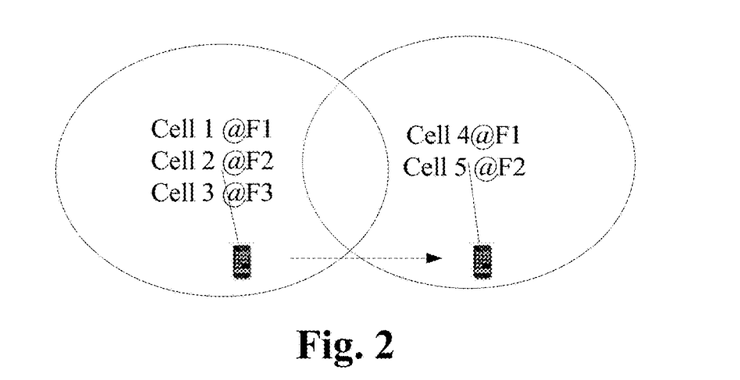
FIG. 2 is a schematic diagram of performing switch by terminal in an existing CA system.

In the existing CA system, as described above, the automatic removal of the measurement identity at the terminal side is only applicable to events A1, A2 and A6 of the existing measurement events. It is assumed that the terminal has three serving cells, a primary cell Cell1 at a frequency F1, a secondary cell Cell2 at a frequency F2 and a secondary cell Cell3 at a frequency F3, as shown in FIG. 2. And at the same time, the terminal is configured with three measurement identities, MeasId1, MeasId2 and MeasId3, which are all stored in the measurement configuration variable of the terminal. In this example, a measurement object associated with MeasId1 is F1, and a measurement event associated with MeasId1 is A2; a measurement object associated with MeasId2 is F2, and a measurement event associated with MeasId2 is A1; and a measurement object associated with MeasId3 is F3, and a measurement event associated with MeasId3 is A6.

If a link failure occurs in the terminal, and the terminal performs the connection re-establishment and succeeds in re-establishing connection in Cell4 at F1, at this moment, the terminal has only one serving cell, that is, Cell4 at F1. At this moment, the terminal discovers that a measurement object associated with MeasId2 is F2, and a cell required by measurement event A1 associated with MeasId2 to be measured is a serving cell, as the terminal has no configured serving cell at F2 at this moment, the terminal needs to remove a record to which MeasId2 corresponds from the measurement identity list in the measurement configuration variable. Of course, if a measurement report record to which MeasId2 corresponds also exists in the measurement report list variable, it should also be removed. Corresponding to MeasId2, if the periodic reporting timer is running, it should be stopped, and at the same time, related information, such as a TTT timer, should be reset. Likewise, corresponding to MeasId3, automatic removal similar to that of MeasId2 should be performed.

If connection reconfiguration, such as switch, occurs in the terminal, after the switch, Cell4 at F1 becomes a primary cell of the terminal, and Cell5 at F2 becomes a secondary cell of the terminal, as shown in FIG. 2. At this moment, the terminal discovers that a measurement object associated with MeasId3 is F3, and measurement event A6 associated with MeasId3 requires that a measurement object is the frequency at which the secondary cell is, as the terminal has no configured serving cell at F3 at this moment, the terminal needs to remove a record to which MeasId3 corresponds from the measurement identity list in the measurement configuration variable. Of course, if a measurement report record to which MeasId3 corresponds also exists in the measurement report list variable, it should also be removed. Corresponding to MeasId3, if the periodic reporting timer is running, it should be stopped, and at the same time, related information, such as a TTT timer, should be reset.

In the dual connectivity architecture, the automatic removal of the measurement identity at the terminal side may be applied to the above new measurement events. The procedure of the automatic removal of the measurement identity by the terminal in the dual connectivity architecture after the connection reconfiguration or the connection re-establishment shall be described below by way of two examples.

Figure 3A:
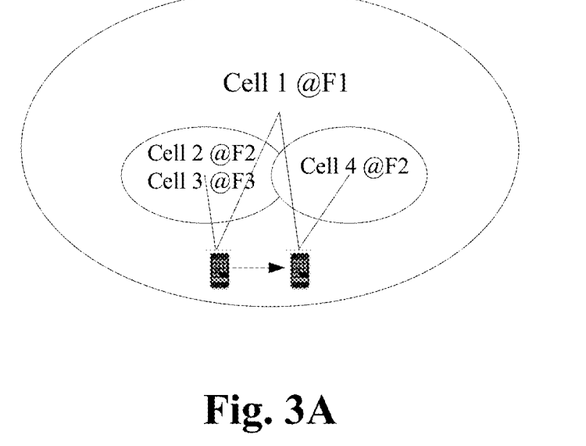
FIG. 3A is a schematic diagram of an implementation of performing connection reconfiguration or connection re-establishment by the terminal in a dual connectivity architecture.

FIG. 3a is an example of the automatic removal of the measurement identity performed by the terminal due to that the measurement object associated with the measurement identity no longer satisfies the requirement of the measurement event associated with the measurement identity on the measurement object. As shown in FIG. 3a, it is assumed that the terminal has three serving cells, the primary cell Cell1 at the frequency F1 belongs to a primary cell group, and the primary secondary cell Cell2 at the frequency F2 and the secondary cell Cell3 at the frequency F3 belong to a secondary cell group, and at the same time, the terminal is configured with three measurement identities, MeasId1, MeasId2 and MeasId3, which are all stored in the measurement configuration variable of the terminal. In this example, a measurement object associated with MeasId1 is F1, and a measurement event associated with MeasId1 is A2; a measurement object associated with MeasId2 is F2, and a measurement event associated with MeasId2 is A1; and a measurement object associated with MeasId3 is F3, and a measurement event associated with MeasId3 is a new measurement event, which is temporarily referred to as A7, for example, the measurement result of the neighboring cell is better than the sum of the measurement result of the primary secondary cell and a predefined offset value. Here, a requirement on a frequency at which a neighboring cell belonging to A7 is operating is that it is contained in the frequency at which the cell belonging to the secondary cell group is operating and at the same time, it is different from the frequency at which the primary secondary cell is operating. If the terminal moves, the dual connectivity changes; for example, the primary cell group does not change, and the secondary eNB changes. At this moment, there exists only one cell in the secondary cell group, that is, primary secondary cell Cell4 at frequency F2. As event A7 to which MeasId3 corresponds requires that the frequency to which the measurement object corresponds needs to be contained in the frequency at which the cell belonging to the secondary cell group is operating but is different from F2, but only F2 exists in the secondary cell group at this moment, the terminal needs to remove a record to which MeasId3 corresponds from the measurement identity list in the measurement configuration variable. Of course, if a measurement report record to which MeasId3 corresponds also exists in the measurement report list variable, it should also be removed. Corresponding to MeasId3, if the periodic reporting timer is running, it should be stopped, and at the same time, related information, such as a TTT timer, should be reset.

Figure 3B:
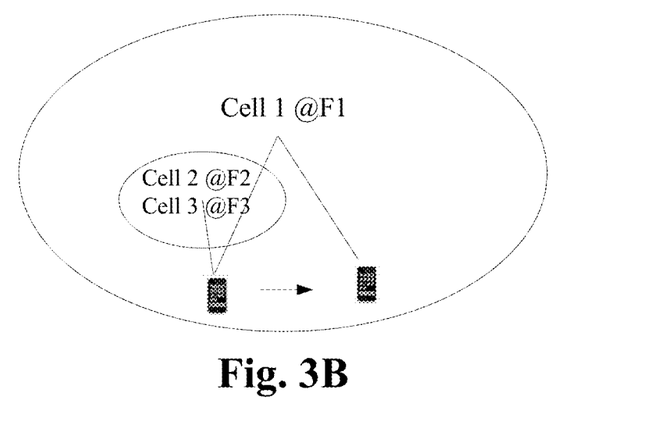
FIG. 3B is a schematic diagram of another implementation of performing connection reconfiguration or connection re-establishment by the terminal in the dual connectivity architecture.

FIG. 3b is an example of the automatic removal of the measurement identity performed by the terminal due to that a definition of the measurement event associated with the measurement identity is no longer satisfied. As shown in FIG. 3b, it is assumed that the terminal has three serving cells, the primary cell Cell1 at the frequency F1 belongs to a primary cell group, and the primary secondary cell Cell2 at the frequency F2 and the secondary cell Cell3 at the frequency F3 belong to a secondary cell group, and at the same time, the terminal is configured with three measurement identities, MeasId1, MeasId2 and MeasId3, which are all stored in the measurement configuration variable of the terminal. In this example, a measurement object associated with MeasId1 is F1, and a measurement event associated with MeasId1 is A2; a measurement object associated with MeasId2 is F2, and a measurement event associated with MeasId2 is a new measurement event, which is temporarily referred to as A8, for example, the measurement result of the neighboring cell is better than the sum of the measurement result of the primary secondary cell and a predefined offset value. A requirement on a neighboring cell in A8 is that it is different from a cell at the frequency at which the primary secondary cell is operating. And a measurement object associated with MeasId3 is F3, and a measurement event associated with MeasId3 is a new measurement event, which is temporarily referred to as A9, for example, the measurement result of the neighboring cell is better than a first threshold, and at the same time, the measurement result of the primary secondary cell is worse than a second threshold. Here, a requirement on a neighboring cell in A9 is that it is different from a cell at the frequency at which the primary secondary cell is operating. If the terminal moves, the primary cell group does not change, but the secondary eNB is released. At this moment, the terminal has no configuration of the primary secondary cell, while events A8 and A9 require that the measurement result of the neighboring cell needs to be compared with the measurement result of the primary secondary cell, hence, the terminal needs to remove records to which MeasId2 and MeasId3 correspond from the measurement identity list in the measurement configuration variable. Of course, if measurement report records to which MeasId2 and MeasId3 correspond also exists in the measurement report list variable, they should also be removed. Corresponding to MeasId2 and MeasId3, if the periodic reporting timers are running, they should be stopped, and at the same time, related information, such as a TTT timer, should be reset.

With the method of the embodiment of the present disclosure, a corresponding solution for automatically removing a measurement identity is provided for the new measurement events configured by the eNB for the terminal in the dual connectivity architecture, thereby reducing meaningless measurement by the terminal, lowering power consumption, and reducing interference on normal communications.

Embodiment 2

Figure 4:
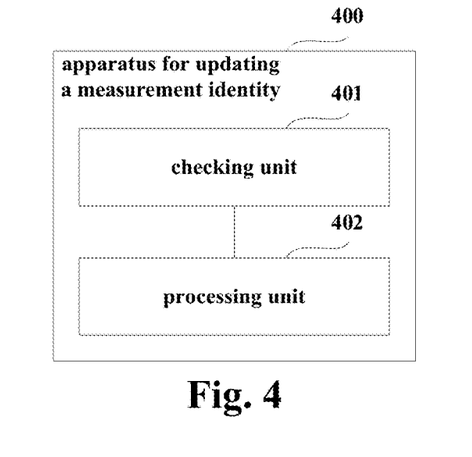
FIG. 4 is a schematic diagram of a structure of an implementation of the apparatus for updating a measurement identity of an embodiment of the present disclosure.

An embodiment of the present disclosure provides an apparatus for updating a measurement identity, which is applicable to terminal equipment in a dual connectivity architecture; however, this embodiment is not limited thereto, and in other implementations, the apparatus may also be applicable to other scenarios where an eNB configures new measurement events. For the convenience of explanation, the apparatus shall be described in this embodiment taking that it is applied to terminal equipment in a dual connectivity architecture as an example. And as principles of the apparatus for solving problems are similar to that of the method of Embodiment 1, implementation of the method of Embodiment 1 may be referred to for the implementation of the apparatus, with identical contents being not going to be described herein any further. FIG. 4 is a schematic diagram of a structure of the apparatus. Referring to FIG. 4, the apparatus 400 includes:

a checking unit 401 configured to check each measurement identity in a measurement identity list included in a pre-stored measurement configuration variable after the terminal equipment performs connection reconfiguration or connection re-establishment;

wherein, as described above, the terminal equipment stores a measurement configuration variable, the measurement configuration variable containing a measurement identity list, the measurement identity list containing at least one measurement identity, each measurement identity being associated with a measurement object and a reporting configuration;

a processing unit 402 configured to remove the measurement identity from the measurement configuration variable, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

In this embodiment, as described above, when reporting configuration associated with a measurement identity includes a new measurement event configured by an eNB for the terminal, and the measurement object related to the new measurement event no longer satisfies the requirement of the measurement event or the cell for comparing in the measurement event no longer exists, the processing unit 402 may remove the measurement identity from the measurement configuration variable In an implementation of this embodiment, the processing unit 402 is further configured to remove a measurement report record to which the measurement identity corresponds from a pre-stored measurement report list variable when the pre-stored measurement report list variable includes the measurement report record to which the measurement identity corresponds.

In this embodiment, as described above, the terminal equipment further stores the measurement report list variable. If the measurement report list variable includes the measurement report record to which the measurement identity corresponds, it shows that the measurement for the measurement identity has triggered a report, and the processing unit 402 removes the record from the measurement report list variable.

In another implementation of this embodiment, the processing unit 402 is further configured to stop a timer which is running and corresponds to the measurement identity, and reset information related to the measurement identity, when the timer corresponding to the measurement identity is running. The timer here may be a periodic reporting timer, and the information related to the measurement identity here may be a TTT timer, etc.

In this embodiment, the new measurement event may be that: a measurement result of a neighboring cell is better than a sum of a measurement result of a primary secondary cell and a predefined offset value, or a measurement result of a neighboring cell is better than a first threshold, and at the same time, a measurement result of a primary secondary cell is worse than a second threshold, or a measurement result of the cell is better than a third threshold, or a measurement result of the cell is worse than a fourth threshold.

In this embodiment, a cell triggering the measurement event is at a frequency indicated by the measurement object; wherein the frequency indicated by the measurement object may be a frequency at which a cell belonging to a secondary cell group or belonging to a secondary eNB of the terminal is operating other than a frequency at which the primary secondary cell is operating, may be a frequency at which a cell belonging to a secondary cell group or belonging to a secondary eNB of the terminal is operating, may be a frequency at which a cell belonging to a primary cell group or belonging to a primary eNB of the terminal is operating, may be a frequency different from a frequency at which a primary cell is operating, may be a frequency different from a frequency at which a primary secondary cell is operating, or may be a frequency different from a frequency at which a primary cell and a primary secondary cell are operating.

In this embodiment, the terminal equipment may perform the connection reconfiguration or connection re-establishment in a dual-connectivity architecture; wherein, after the connection reconfiguration is performed, the primary cell of the terminal equipment does not change, but the secondary eNB changes; or, the primary cell of the terminal equipment does not change, the secondary eNB does not change, but the primary secondary cell changes; or, the primary cell and the primary secondary cell of the terminal equipment do not change, but a normal secondary cell changes; or, the primary cell of the terminal equipment does not change, but the dual-connectivity architecture does not exist any longer; or, the primary cell of the terminal equipment changes. In this embodiment, after the connection re-establishment is performed, the terminal equipment has only one serving cell, that is, the primary cell.

With the apparatus of the embodiment of the present disclosure, a corresponding solution for automatically removing a measurement identity is provided for the new measurement events configured by the eNB for the terminal in the dual connectivity architecture, thereby reducing meaningless measurement by the terminal, lowering power consumption, and reducing interference on normal communications.

Embodiment 3

An embodiment of the present disclosure provides terminal equipment, including the apparatus for updating a measurement identity as described in Embodiment 2.

Figure 5:
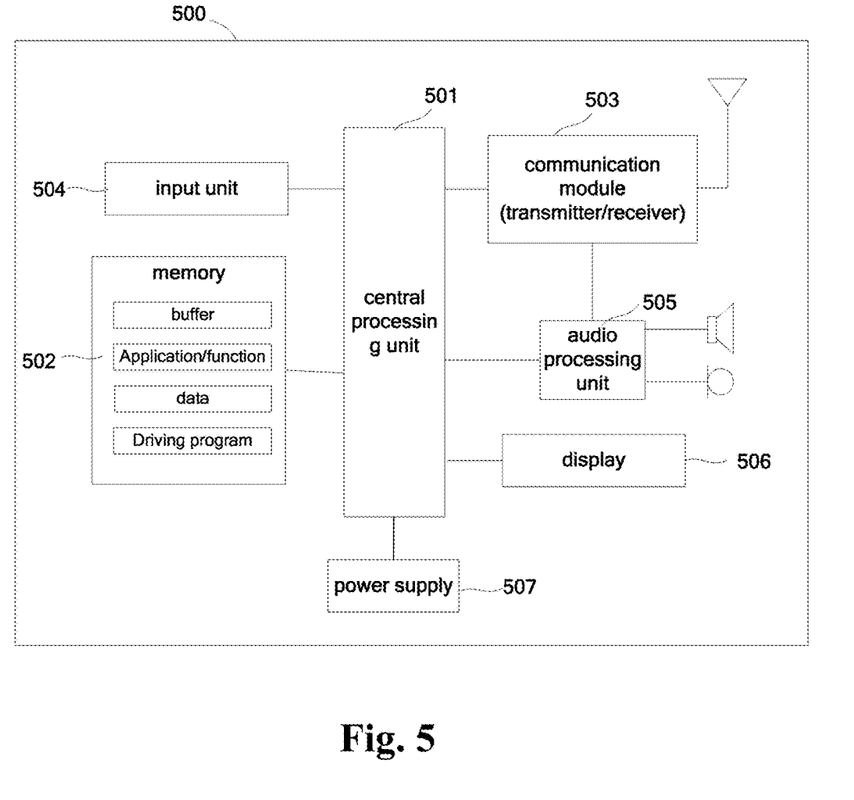
FIG. 5 is a schematic diagram of a structure of an implementation of the terminal equipment of an embodiment of the present disclosure.

FIG. 5 is a block diagram of a systematic structure of the terminal equipment 500 of the embodiment of the present disclosure. As shown in FIG. 5, the terminal equipment 500 may include a central processing unit 501 and a memory 502, the memory 502 being coupled to the central processing unit 501. It should be noted that this figure is illustrative only, and other types of structures may also be used, so as to supplement or replace this structure and achieve telecommunications function or other functions.

In an implementation, the functions of the apparatus for updating a measurement identity may be integrated into the central processing unit 501. In this implementation, the central processing unit 501 may be configured to: check each measurement identity in a measurement identity list included in a pre-stored measurement configuration variable after the terminal equipment performs connection reconfiguration or connection re-establishment; and remove the measurement identity from the measurement configuration variable, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

Alternatively, the central processing unit 501 may further be configured to, when a pre-stored measurement report list variable includes a measurement report record to which the measurement identity corresponds, remove the measurement report record to which the measurement identity corresponds from the pre-stored measurement report list variable.

Alternatively, the central processing unit 501 may further be configured to, when a timer corresponding to the measurement identity is running, stop the timer which is running and corresponds to the measurement identity, and reset information related to the measurement identity.

Alternatively, the measurement event is that: a measurement result of a neighboring cell is better than a sum of a measurement result of a primary secondary cell and a predefined offset value; or a measurement result of a neighboring cell is better than a first threshold, and at the same time, a measurement result of a primary secondary cell is worse than a second threshold; or a measurement result of the cell is better than a third threshold; or a measurement result of the cell is worse than a fourth threshold.

Alternatively, a cell triggering the measurement event is at a frequency indicated by the measurement object; wherein, the frequency indicated by the measurement object includes: a frequency at which a cell belonging to a secondary cell group or belonging to a secondary eNB of the terminal is operating other than a frequency at which the primary secondary cell is operating; or a frequency at which a cell belonging to a secondary cell group or belonging to a secondary eNB of the terminal is operating; or a frequency at which a cell belonging to a primary cell group or belonging to a primary eNB of the terminal is operating; or a frequency different from a frequency at which a primary cell is operating; or a frequency different from a frequency at which a primary secondary cell is operating; or a frequency different from a frequency at which a primary cell and a primary secondary cell are operating, and this embodiment is not limited thereto.

Alternatively, the terminal equipment performs the connection reconfiguration or connection re-establishment in a dual-connectivity architecture. In this embodiment, after the connection reconfiguration is performed, the primary cell of the terminal equipment does not change, but the secondary eNB changes; or, the primary cell of the terminal equipment does not change, the secondary eNB does not change, but the primary secondary cell changes; or, the primary cell and the primary secondary cell of the terminal equipment do not change, but a normal secondary cell changes; or, the primary cell of the terminal equipment does not change, but the dual-connectivity architecture does not exist any longer; or, the primary cell of the terminal equipment changes. And in this embodiment, after the connection re-establishment is performed, the terminal equipment has only one serving cell, that is, the primary cell.

In another implementation, the apparatus for updating a measurement identity and the central processing unit 501 may be configured separately. For example, the apparatus for updating a measurement identity may be configured as a chip connected to the central processing unit 501, with its functions being realized under control of the central processing unit 501.

As shown in FIG. 5, the terminal equipment 500 may further include a communication module 503, an input unit 504, an audio processing unit 505, a display 506 and a power supply 507. It should be noted that the terminal equipment 500 does not necessarily include all the parts shown in FIG. 5. And furthermore, the terminal equipment 500 may include components not shown in FIG. 5, and the related art may be referred to.

As shown in FIG. 5, the central processing unit 501 is sometimes referred to as a controller or control, and may include a microprocessor or other processor devices and/or logic devices. The central processing unit 501 receives input and controls operations of every components of the terminal equipment 500.

In this implementation, the memory 502 may be, for example, one or more of a buffer memory, a flash memory, a hard drive, a mobile medium, a volatile memory, a nonvolatile memory, or other suitable devices. It may store the above measurement configuration variable and the above measurement report list variable, and may further store programs executing related information. And the central processing unit 501 may execute the programs stored in the memory 502, so as to realize information storage or processing, etc. Functions of other parts are similar to those of the related art, which shall not be described herein any further. The parts of the terminal equipment 500 may be realized by specific hardware, firmware, software, or any combination thereof, without departing from the scope of the present disclosure.

With the terminal equipment of this embodiment, a corresponding solution for automatically removing a measurement identity is provided for the new measurement events configured by the eNB for the terminal in the dual connectivity architecture, thereby reducing meaningless measurement by the terminal, lowering power consumption, and reducing interference on normal communications.

Embodiment 4

An embodiment of the present disclosure provides a communication system, including an eNB and terminal equipment. The eNB is configured to configure the terminal equipment with new measurement events, which is as described above, and shall not be described herein any further. And the terminal equipment is configured to check each measurement identity in a measurement identity list included in a pre-stored measurement configuration variable after performing connection reconfiguration or connection re-establishment, and remove the measurement identity from the measurement configuration variable, if reporting configuration associated with the measurement identity includes a measurement event related to a frequency at which a cell belonging to a secondary cell group of the terminal equipment is operating and a measurement object related to the measurement event no longer satisfies a requirement of the measurement event or a cell for comparing in the measurement event no longer exists.

In an implementation, the terminal equipment is further configured to: if a pre-stored measurement report list variable includes a measurement report record to which the measurement identity corresponds, remove the measurement report record to which the measurement identity corresponds from the pre-stored measurement report list variable.

In an implementation, the terminal equipment is further configured to: if a timer corresponding to the measurement identity is running, stop the timer which is running and corresponds to the measurement identity, and reset information related to the measurement identity.

In an implementation, the terminal equipment is further configured to: perform the connection reconfiguration or connection re-establishment in a dual-connectivity architecture.

Figure 6:
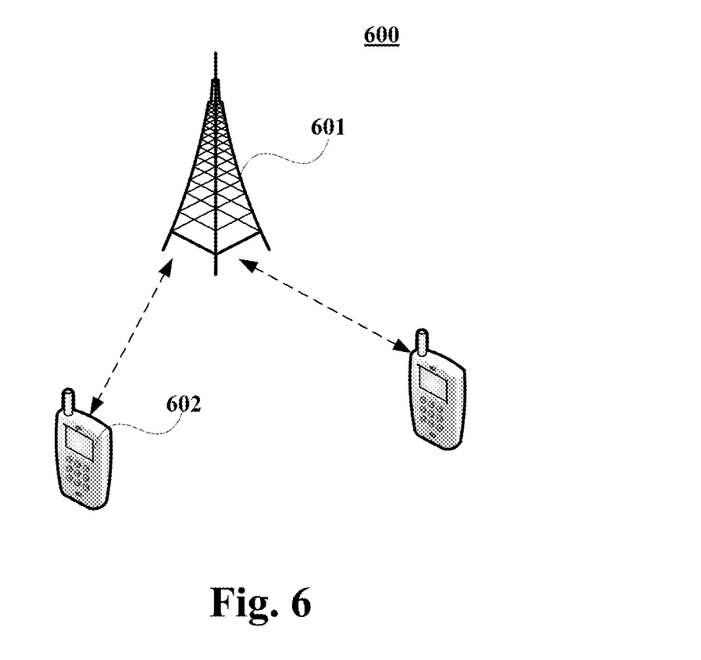
FIG. 6 is a schematic diagram of a structure of the communication system of an embodiment of the present disclosure.

FIG. 6 is a schematic diagram of a structure of the communication system of the embodiment of the present disclosure. As shown in FIG. 6, the communication system 600 includes an eNB 601 and terminal equipment 602. In this embodiment, the eNB 601 is configured to configure the terminal equipment 602 with new measurement events, and the terminal equipment 602 may be the terminal equipment 500 described in Embodiment 3. As the terminal equipment 500 has described in detail in Embodiment 3, its contents are incorporated herein, which shall not be described herein any further.

In an implementation of this embodiment, the terminal equipment is in a dual connectivity architecture, the communication system may further include an eNB (not shown), and the eNB 601 shown in FIG. 6 may be a primary eNB of the terminal equipment 602, and may also be a secondary eNB of the terminal equipment 602; as the primary eNB of the terminal equipment 602, it may be an eNB, and may also be an RRH; and as the secondary eNB of the terminal equipment 602, it may be an eNB, and may also be an RRH, etc.

With the communication system of this embodiment, a corresponding solution for automatically removing a measurement identity is provided for the new measurement events configured by the eNB for the terminal in the dual connectivity architecture, thereby reducing meaningless measurement by the terminal, lowering power consumption, and reducing interference on normal communications.

An embodiment of the present disclosure further provides a computer-readable program, wherein when the program is executed in terminal equipment, the program enables the terminal equipment to carry out the method for updating a measurement identity as described in Embodiment 1.

An embodiment of the present disclosure further provides a storage medium in which a computer-readable program is stored, wherein the computer-readable program enables an identity to carry out the method for updating a measurement identity as described in Embodiment 1.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A method for updating a measurement identity, comprising:
    checking each measurement identity in a measurement identity list included in a pre-stored measurement configuration variable by terminal equipment after performing connection reconfiguration or connection re-establishment; and
    removing the measurement identity from the pre-stored measurement configuration variable by the terminal equipment, if reporting configuration associated with the measurement identity includes a measurement event related to a frequency which a serving cell in a secondary cell group of the terminal equipment is on and the serving cell for comparing in the measurement event is not configured;
    wherein the measurement event related to the frequency which the serving cell in the secondary cell group of the terminal equipment is on is that:
        a measurement result of a neighboring cell of the serving cell is better than a sum of a measurement result of a primary secondary cell and a predefined offset value; or
        a measurement result of a neighboring cell of the serving cell is better than a first threshold value, and at the same time, a measurement result of a primary secondary cell is worse than a second threshold value.

2. The method according to claim 1, wherein if a pre-stored measurement report list variable includes a measurement report record to which the measurement identity corresponds, the method further comprises:
    removing the measurement report record to which the measurement identity corresponds from the pre-stored measurement report list variable by the terminal equipment.

3. The method according to claim 1, wherein if a timer corresponding to the measurement identity is running, the method further comprises:
    stopping the timer which is running and corresponds to the measurement identity, and resetting information related to the measurement identity.

4. The method according to claim 1, wherein the measurement event related to a frequency which a serving cell in a secondary cell group of the terminal equipment is on is that:
    a measurement result of the serving cell is better than a third threshold value; or
    a measurement result of the serving cell is worse than a fourth threshold value.

5. The method according to claim 1, wherein a serving cell triggering the measurement event is on a frequency indicated by the measurement object; and
    wherein the frequency indicated by the measurement object comprises:
        a frequency which a serving cell in a secondary cell group or in a secondary base station of the terminal equipment is on other than the frequency which the primary secondary cell is on; or
        a frequency which a serving cell in a secondary cell group or in a secondary base station of the terminal equipment is on; or a frequency which a serving cell in a primary cell group or in a primary base station of the terminal equipment is on; or a frequency which the terminal equipment is operating on other than a frequency which a primary cell is on; or a frequency which the terminal equipment is operating on other than a frequency which a primary secondary cell is on; or a frequency which the terminal equipment is operating on other than a frequency which a primary cell and a primary secondary cell are on.

6. The method according to claim 1, wherein the terminal equipment performs the connection reconfiguration or connection re-establishment in a dual-connectivity architecture.

7. The method according to claim 6, wherein after the connection reconfiguration is performed, a primary cell of the terminal equipment does not change, but a secondary base station changes; or, the primary cell of the terminal equipment does not change, the secondary base station does not change, but the primary secondary cell changes; or, the primary cell and the primary secondary cell of the terminal equipment do not change, but a normal secondary cell changes; or, the primary cell of the terminal equipment does not change, but the dual-connectivity architecture does not exist any longer; or, the primary cell of the terminal equipment changes.

8. The method according to claim 6, wherein after the connection re-establishment is performed, the terminal equipment has only one serving cell, that is, a primary cell.

9. An apparatus for updating a measurement identity, applicable to terminal equipment, wherein the apparatus comprises:

a checking unit configured to check each measurement identity in a measurement identity list included in a pre-stored measurement configuration variable after the terminal equipment performs connection reconfiguration or connection re-establishment; and a processing unit configured to remove the measurement identity from the pre-stored measurement configuration variable, if reporting configuration associated with the measurement identity includes a measurement event related to a frequency which a serving cell in a secondary cell group of the terminal equipment is on and the serving cell for comparing in the measurement event is not configured, wherein the measurement event related to the frequency which the serving cell in the secondary cell group of the terminal equipment is on is that:

a measurement result of a neighboring cell of the serving cell is better than a sum of a measurement result of a primary secondary cell and a predefined offset value; or a measurement result of a neighboring cell of the serving cell is better than a first threshold value, and at the same time, a measurement result of a primary secondary cell is worse than a second threshold value.

10. The apparatus according to claim 9, wherein the processing unit is further configured to remove the measurement report record to which the measurement identity corresponds from the pre-stored measurement report list variable when a pre-stored measurement report list variable includes a measurement report record to which the measurement identity corresponds.

11. The apparatus according to claim 9, wherein the processing unit is further configured to stop a timer which is running and corresponds to the measurement identity, and reset information related to the measurement identity, when the timer corresponding to the measurement identity is running.

12. The apparatus according to claim 9, wherein the measurement event related to a frequency which a serving cell in a secondary cell group of the terminal equipment is on is that:

a measurement result of the serving cell is better than a third threshold value; or a measurement result of the serving cell is worse than a fourth threshold value.

13. The apparatus according to claim 9, wherein a serving cell triggering the measurement event is on a frequency indicated by the measurement object; and wherein the frequency indicated by the measurement object comprises:

a frequency which a serving cell in a secondary cell group or in a secondary base station of the terminal equipment is on other than the frequency which the primary secondary cell is on; or a frequency which a serving cell in a secondary cell group or in a secondary base station of the terminal equipment is on; or a frequency which a serving cell in a primary cell group or in a primary base station of the terminal equipment is on; or a frequency of the terminal equipment is operating on other than a frequency which a primary cell is on; or a frequency of the terminal equipment is operating on other than a frequency which a primary secondary cell is on; or a frequency of the terminal equipment is operating on other than a frequency which a primary cell and a primary secondary cell are on.

14. The apparatus according to claim 9, wherein the terminal equipment performs the connection reconfiguration or connection re-establishment in a dual-connectivity architecture.

15. The apparatus according to claim 14, wherein after the connection reconfiguration is performed, a primary cell of the terminal equipment does not change, but a secondary base station changes; or, the primary cell of the terminal equipment does not change, the secondary base station does not change, but the primary secondary cell changes; or, the primary cell and the primary secondary cell of the terminal equipment do not change, but a normal secondary cell changes; or, the primary cell of the terminal equipment does not change, but the dual-connectivity architecture does not exist any longer; or, the primary cell of the terminal equipment changes.

16. The apparatus according to claim 14, wherein after the connection re-establishment is performed, the terminal equipment has only one serving cell, that is, a primary cell.

17. A communication system, comprising a base station and terminal equipment, wherein the terminal equipment is configured to check each measurement identity in a measurement identity list included in a pre-stored measurement configuration variable after performing connection reconfiguration or connection re-establishment, and remove the measurement identity from the pre-stored measurement configuration variable, if reporting configuration associated with the measurement identity includes a measurement event related to a frequency which a serving cell in a secondary cell group of the terminal equipment is on and the serving cell for comparing in the measurement event is not configured;

wherein the measurement event related to the frequency which the serving cell in the secondary cell group of the terminal equipment is on is that:

a measurement result of a neighboring cell of the serving cell is better than a sum of a measurement result of a primary secondary cell and a predefined offset value; or a measurement result of a neighboring cell of the serving cell is better than a first threshold value, and at the same time, a measurement result of a primary secondary cell is worse than a second threshold value.

18. The communication system according to claim 17, wherein the terminal equipment is further configured to, if a pre-stored measurement report list variable includes a measurement report record to which the measurement identity corresponds, remove the measurement report record to which the measurement identity corresponds from the pre-stored measurement report list variable.

19. The communication system according to claim 17, wherein the terminal equipment is further configured to, if a timer corresponding to the measurement identity is running, stop the timer which is running and corresponds to the measurement identity, and reset information related to the measurement identity.

20. The communication system according to claim 17, wherein the terminal equipment is further configured to, perform the connection reconfiguration or connection re-establishment in a dual-connectivity architecture.

* * * * *